US009669462B2

(12) United States Patent
Yang et al.

(10) Patent No.: US 9,669,462 B2
(45) Date of Patent: Jun. 6, 2017

(54) POROUS ALUMINUM SINTERED COMPACT (71) Applicant: MITSUBISHI MATERIALS CORPORATION, Tokyo (JP)

(72) Inventors: Ji-bin Yang, Kitamoto (JP); Koji Hoshino, Kitamoto (JP); Toshihiko Saiwai, Kitamoto (JP)

(73) Assignee: MITSUBISHI MATERIALS CORPORATION, Tokyo (JP)

( * ) Notice: Subject to any disclaimer, the term of this patent is extended or adjusted under 35 U.S.C. 154(b) by 0 days.

(21) Appl. No.: 14/768,330

(22) PCT Filed: Feb. 27, 2014

(86) PCT No.: PCT/JP2014/054869
§ 371 (c)(1),
(2) Date: Aug. 17, 2015

(87) PCT Pub. No.: WO2014/133077
PCT Pub. Date: Sep. 4, 2014

(65) Prior Publication Data
US 2016/0008888 A1    Jan. 14, 2016

(30) Foreign Application Priority Data

Mar. 1, 2013 (JP) .................................. 2013-040876
Feb. 18, 2014 (JP) .................................. 2014-028873

(51) Int. Cl.
*B32B 5/18* (2006.01)
*B22F 3/11* (2006.01)
(Continued)

(52) U.S. Cl.
CPC ....... *B22F 3/11* (2013.01); *B22F 7/06* (2013.01); *C22C 1/0416* (2013.01); *C22C 1/08* (2013.01);
(Continued)

(58) Field of Classification Search
None
See application file for complete search history.

(56) References Cited

U.S. PATENT DOCUMENTS 6,228,509 B1 * 5/2001 Mizumoto ............. H05K 9/009
174/388
2012/0094142 A1    4/2012 Hoshino et al.
(Continued)

FOREIGN PATENT DOCUMENTS

CA    1176490 A    10/1984
CN    101089209 A    12/2007
(Continued)

OTHER PUBLICATIONS

International Search Report mailed Apr. 1, 2014 for the corresponding PCT Application No. PCT/JP2014/054869.
(Continued)

*Primary Examiner* — Daniel J Schleis
(74) *Attorney, Agent, or Firm* — Leason Ellis LLP (57) ABSTRACT

This porous aluminum sintered compact is a porous aluminum sintered compact in which a plurality of aluminum base materials are sintered together, and a Ti—Al-based compound is present in bonding portions at which the aluminum base materials are bonded together. It is preferable that a plurality of columnar protrusions protruding outwards are formed on an outer surface of the aluminum base material and the bonding portions are present at the columnar protrusions.

6 Claims, 8 Drawing Sheets

(51) Int. Cl.
  *C22C 1/08*   (2006.01)
  *C22C 21/00*  (2006.01)
  *B22F 7/06*   (2006.01)
  *C22C 1/04*   (2006.01)
  *H01M 4/66*   (2006.01)
  *H01M 4/80*   (2006.01)
  *B22F 5/00*   (2006.01)

(52) U.S. Cl.
  CPC .............. *C22C 21/00* (2013.01); *H01M 4/661* (2013.01); *H01M 4/805* (2013.01); *B22F 2005/005* (2013.01)

(56) References Cited

U.S. PATENT DOCUMENTS

| | | | | |
|---|---|---|---|---|
| 2012/0135142 | A1* | 5/2012 | Yang | H01M 4/80 427/247 |
| 2013/0305673 | A1* | 11/2013 | Zeller | B01D 39/2034 55/523 |

FOREIGN PATENT DOCUMENTS

| | | | |
|---|---|---|---|
| EP | 2939762 A | 11/2015 | |
| EP | 2962786 A | 1/2016 | |
| JP | 56-149363 A | 11/1981 | |
| JP | 01-100204 A | 4/1989 | |
| JP | 01-215909 A | 8/1989 | |
| JP | 05-277312 A | 10/1993 | |
| JP | 08-325661 A | 12/1996 | |
| JP | 10-046209 A | 2/1998 | |
| JP | 2009-256788 A | 11/2009 | |
| JP | 2010-280951 A | 12/2010 | |
| JP | 2011-023430 A | 2/2011 | |
| JP | 2011-049023 A | 3/2011 | |
| JP | 2011-077269 A | 4/2011 | |
| JP | 2011-096444 A | 5/2011 | |
| JP | 2011-253645 A | 12/2011 | |
| JP | 2012-036470 A | 2/2012 | |
| JP | 2012-089303 A | 5/2012 | |
| JP | 2012-119465 A | 6/2012 | |
| WO | WO-2010/116679 A | 10/2010 | |

OTHER PUBLICATIONS

Office Action mailed Jul. 8, 2014 for the corresponding Japanese Application No. 2014-028873.
Office Action mailed Feb. 1, 2016 for the corresponding Chinese Patent Application No. 201480004240.7.
Extended European Search Report mailed Jul. 25, 2016 for the corresponding European Patent Application No. 14757373.7.

* cited by examiner

POROUS ALUMINUM SINTERED COMPACT

CROSS-REFERENCE TO RELATED PATENT APPLICATIONS

This application is a U.S. National Phase Application under 35 U.S.C. §371 of International Patent Application No. PCT/JP2014/054869, filed Feb. 27, 2014, and claims the benefit of Japanese Patent Applications No. 2013-040876, filed Mar. 1, 2013 and No. 2014-028873, filed Feb. 18, 2014, all of which are incorporated by reference in their entirety herein. The International Application was published in Japanese on Sep. 4, 2014 as International Publication No. WO/2014/133077 under PCT Article 21(2).

FIELD OF THE INVENTION

The present invention relates to a porous aluminum sintered compact obtained by sintering a plurality of aluminum base materials together.

BACKGROUND OF THE INVENTION

The above-described porous aluminum sintered compact is used for, for example, electrodes and current collectors in a variety of batteries, heat exchanger components, silencing components, filters, impact-absorbing components, and the like.

In the related art, the above-described porous aluminum sintered compact is produced using, for example, the methods disclosed by Patent Documents 1 to 5.

In Patent Document 1, a mixture is formed by mixing aluminum powder, paraffin wax particles, and a binder, and the mixture is shaped into a sheet shape. This mixture is naturally dried. Next, the mixture is immersed in an organic solvent so as to remove the wax particles, subsequently, drying, defatting, and sintering are carried out; and thereby, a porous aluminum sintered compact is produced.

In addition, in Patent Documents 2 to 4, aluminum powder, sintering aid powder containing titanium, a binder, a plasticizer, and an organic solvent are mixed together so as to form a viscous composition, the viscous composition is shaped and foamed. Then, the viscous composition is heated and sintered in a non-oxidizing atmosphere; and thereby, a porous aluminum sintered compact is produced.

Furthermore, in Patent Document 5, base powder consisting of aluminum, Al alloy powder used to form bridging portions which contains a eutectic element, and the like are mixed together and the mixture is heated and sintered in a hydrogen atmosphere or a mixed atmosphere of hydrogen and nitrogen; and thereby, a porous aluminum sintered compact is produced. Meanwhile, this porous aluminum sintered compact has a structure in which the particles of the base powder consisting of aluminum are connected together through bridging portions having a hypereutectic structure.

Meanwhile, in the porous aluminum sintered compact and the method for producing the porous aluminum sintered compact described in Patent Document 1, there has been a problem in that it is difficult to obtain a porous aluminum sintered compact having high porosity. Furthermore, in the case in which the aluminum base materials are sintered together, the bonding between the aluminum base materials is hindered by oxide films formed on the surfaces of the aluminum base materials and there has been a problem in that it is not possible to obtain a porous aluminum sintered compact having sufficient strength.

In addition, in the porous aluminum sintered compact and the method for producing the porous aluminum sintered compact described in Patent Documents 2 to 4, there has been a problem in that, since the viscous composition is shaped and foamed, it is not possible to efficiently produce a porous aluminum sintered compact. Furthermore, there has been another problem in that, since the viscous composition contains a large amount of a binder, a long period of time is required for a binder removal treatment, the shrinkage ratio of the compact becomes large during sintering, and it is not possible to produce a porous aluminum sintered compact with excellent dimensional accuracy.

Furthermore, in the porous aluminum sintered compact and the method for producing the porous aluminum sintered compact described in Patent Document 5, there is provided a structure in which the particles of the base powder consisting of aluminum are bonded together through the bridging portions having a hypereutectic structure. In this structure, Al alloy powder having a eutectic composition and a low melting point is melted so as to generate a liquid phase and the liquid phase is solidified among the base powder particles; and thereby, the bridging portions are formed. Therefore, it has been difficult to obtain a porous aluminum sintered compact having high porosity.

PRIOR ART DOCUMENTS

Patent Documents

Patent Document 1: Japanese Unexamined Patent Application, First Publication No. 2009-256788
Patent Document 2: Japanese Unexamined Patent Application, First Publication No. 2010-280951
Patent Document 3: Japanese Unexamined Patent Application, First Publication No. 2011-023430
Patent Document 4: Japanese Unexamined Patent Application, First Publication No. 2011-077269
Patent Document 5: Japanese Unexamined Patent Application, First Publication No. H08-325661

SUMMARY OF THE INVENTION

Problems to be Solved by the Invention

The present invention has been made in consideration of the above-described circumstances and the present invention aims to provide a high-quality porous aluminum sintered compact which can be efficiently produced at low cost and has a small shrinkage ratio during sintering, excellent dimensional accuracy, and sufficient strength.

Means for Solving the Problem

In order to solve the above-described problems and achieve the above-described object, the porous aluminum sintered compact of the present invention is a porous aluminum sintered compact in which a plurality of aluminum base materials are sintered together, wherein a Ti—Al-based compound is present in bonding portions at which the aluminum base materials are bonded together.

According to the porous aluminum sintered compact of the present invention provided with the above-described features, since the Ti—Al-based compound is present in the bonding portions between the aluminum base materials, the diffusion and migration of aluminum are suppressed (limited). Therefore, it is possible to maintain gaps between the aluminum base materials and a porous aluminum sintered compact can be obtained.

Here, in the porous aluminum sintered compact of the present invention, it is preferable that a plurality of columnar protrusions protruding outwards are formed on an outer surface of the aluminum base material and the bonding portions are present at the columnar protrusions.

In this case, since a structure is provided in which the aluminum base materials are bonded together through the columnar protrusions formed on the outer surfaces of the aluminum base materials, it is possible to produce a porous aluminum sintered compact having high porosity without separately carrying out a foaming step and the like. Therefore, it becomes possible to efficiently produce the porous aluminum sintered compact at low cost.

Furthermore, unlike the case in which a viscous composition is used, a large amount of a binder is not present between the aluminum base materials; and therefore, the shrinkage ratio during sintering is small and it becomes possible to obtain a porous aluminum sintered compact having excellent dimensional accuracy.

In addition, in the porous aluminum sintered compact of the present invention, it is preferable that the Ti—Al-based compound mainly includes $Al_3Ti$.

In this case, since $Al_3Ti$ is present as the Ti—Al-based compound in the bonding portions between the aluminum base materials, the aluminum base materials can be favorably bonded together and it is possible to ensure the strength of the porous aluminum sintered compact.

In addition, in the porous aluminum sintered compact of the present invention, the aluminum base materials are preferably composed of either one or both of aluminum fibers and aluminum powder.

In the case in which aluminum fibers are used as the aluminum base materials, it is easy to maintain gaps when the aluminum fibers are bonded together through the columnar protrusions, and there is a tendency for the porosity to increase. Therefore, when aluminum fibers and aluminum powder are used as the aluminum base materials and the mixing ratio thereof is adjusted, it becomes possible to control the porosity of the porous aluminum sintered compact.

Furthermore, in the porous aluminum sintered compact of the present invention, the porosity is preferably set to be in a range of 30% to 90%.

In the porous aluminum sintered compact having the above-described features, since the porosity is controlled to be in a range of 30% to 90%, it becomes possible to provide a porous aluminum sintered compact having the optimal porosity for a particular use.

Effects of the Invention

According to the present invention, it is possible to provide a high-quality porous aluminum sintered compact which can be efficiently produced at low cost and has a small shrinkage ratio during sintering, excellent dimensional accuracy, and sufficient strength.

BRIEF DESCRIPTION OF THE DRAWINGS

FIG. 1(a) is an observation photograph of the porous aluminum sintered compact and FIG. 1(b) is a schematic enlarged view of the porous aluminum sintered compact.

FIGS. 2(a) and 2(b) are SEM observation photographs of the joining portion, FIG. 2(c) is a composition analysis result showing an Al distribution in the joining portion, and FIG. 2(d) is a composition analysis result showing a Ti distribution in the joining portion.

FIGS. 3(a) and 3(b) are SEM observation photographs of the aluminum sintering material, FIG. 3(c) is a composition analysis result showing an Al distribution in the aluminum sintering material, and FIG. 3(d) is a composition analysis result showing a Ti distribution in the aluminum sintering material.

FIG. 5(a) shows the aluminum sintering material in which the aluminum base material is an aluminum fiber and FIG. 5(b) shows the aluminum sintering material in which the aluminum base material is aluminum powder.

FIG. 7(a) shows the case in which the aluminum base material is an aluminum fiber and FIG. 7(b) shows the case in which the aluminum base material is aluminum powder.

DETAILED DESCRIPTION OUT THE INVENTION

Hereinafter, a porous aluminum sintered compact 10 which is an embodiment of the present invention will be described with reference to the accompanying drawings.

Figure 1:
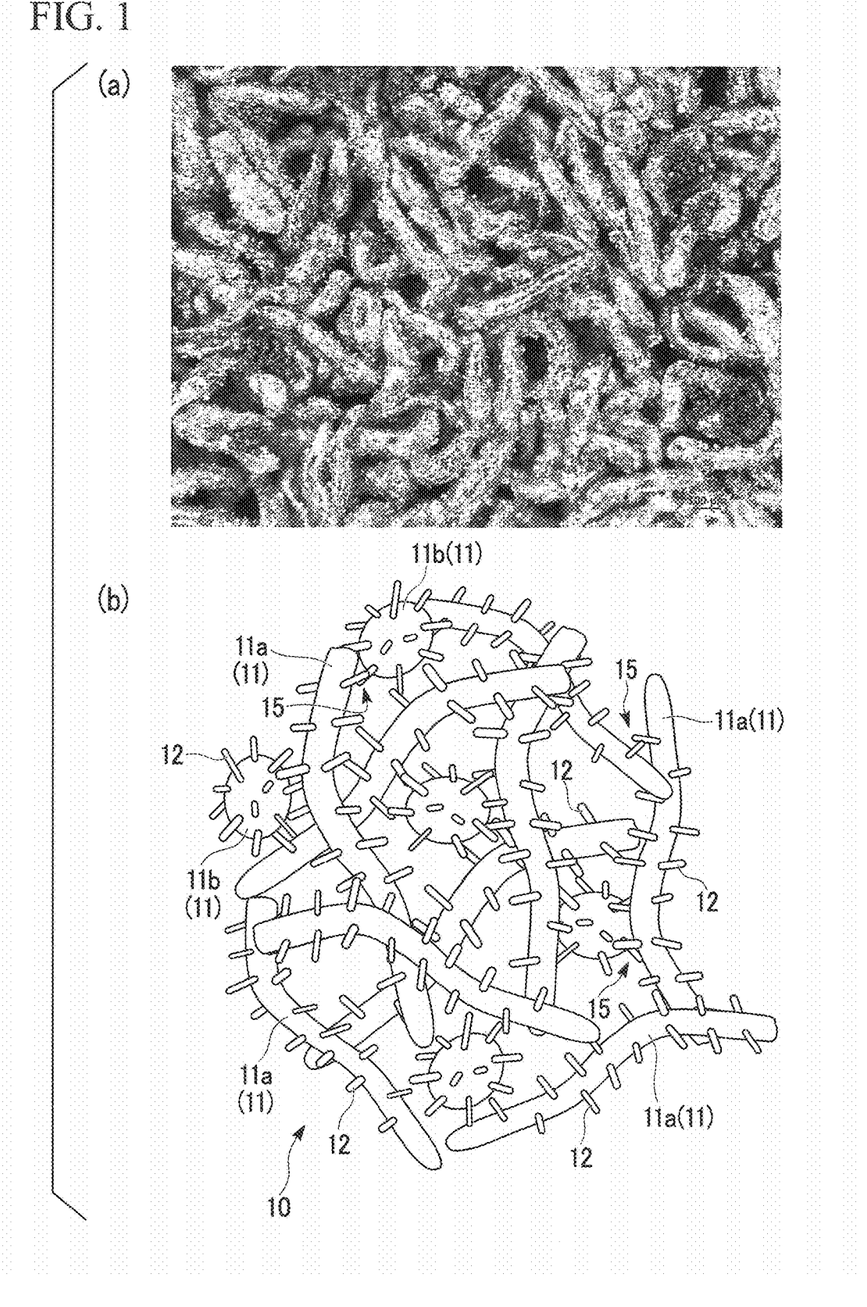
FIG. 1 shows a porous aluminum sintered compact which is an embodiment of the present invention.

FIG. 1 shows a porous aluminum sintered compact 10 according to the present embodiment. FIG. 1(a) is an observation photograph of the porous aluminum sintered compact according to the present embodiment and FIG. 1(b) is a schematic view of the porous aluminum sintered compact according to the present embodiment.

As shown in FIG. 1, the porous aluminum sintered compact 10 according to the present embodiment is obtained by integrating a plurality of aluminum base materials 11 through sintering and the porosity is set to be in a range of 30% to 90%.

In the present embodiment, as shown in FIG. 1, aluminum fibers 11a and aluminum powder (aluminum powder particles) 11b are used as the aluminum base materials 11.

In addition, a plurality of columnar protrusions 12 protruding outwards are formed on the outer surfaces of the aluminum base materials 11 (the aluminum fibers 11a and the aluminum powder 11b), and a structure is provided in which a plurality of the aluminum base materials 11 (the aluminum fibers 11a and the aluminum powder 11b) are bonded together through the columnar protrusions 12. As shown in FIG. 1, bonding portions 15 between the aluminum base materials 11 and 11 include portions at which the columnar protrusions 12 and 12 are bonded together, portions at which the columnar protrusion 12 and the side surface of the aluminum base material 11 are joined together, and portions at which the side surfaces of the aluminum base materials 11 and 11 are joined together.

Figure 2:
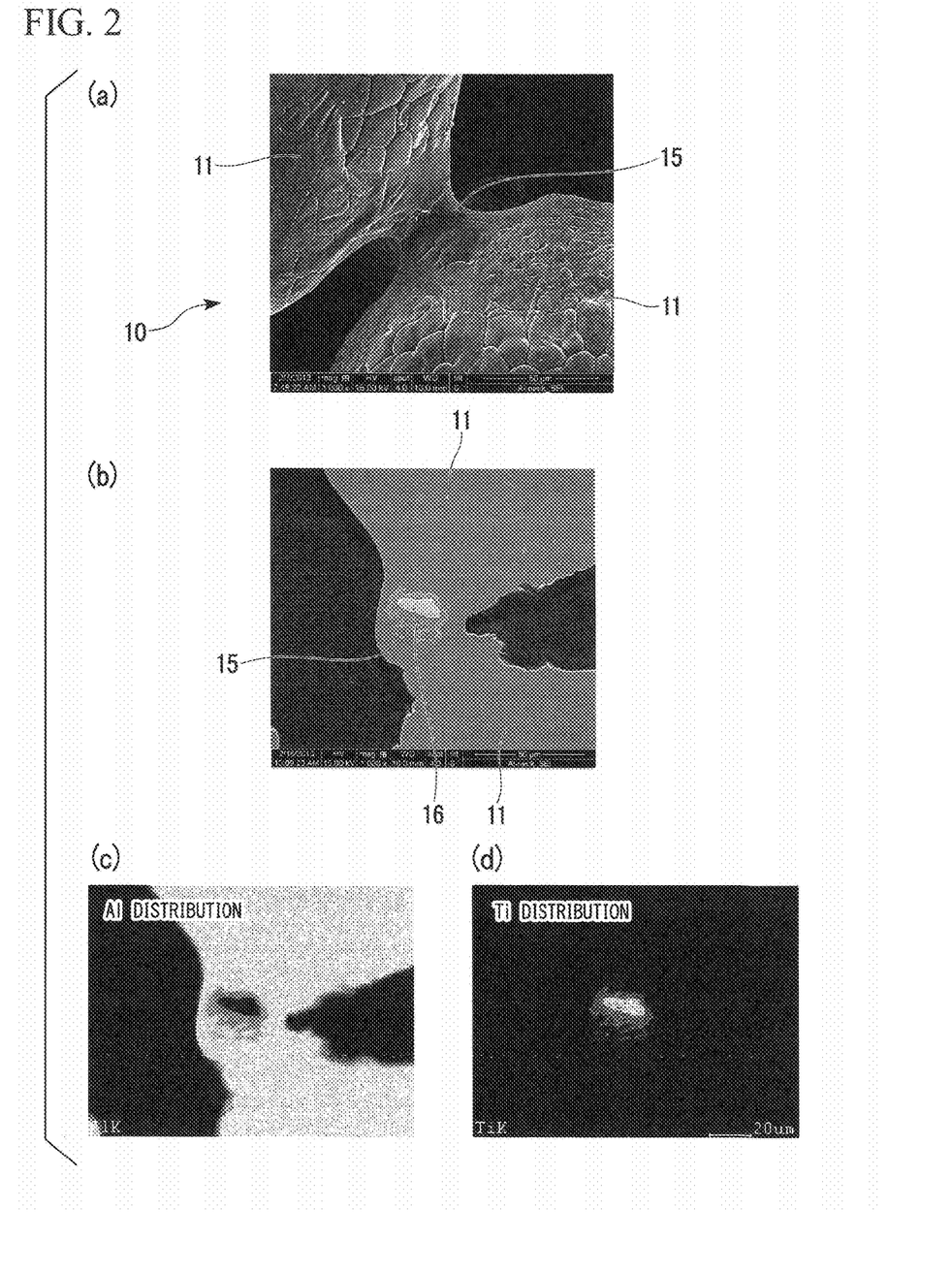
FIG. 2 shows a joining portion between aluminum base materials in the porous aluminum sintered compact shown in FIG. 1.

As shown in FIG. 2, a Ti—Al-based compound 16 is present in the bonding portion 15 between the aluminum base materials 11 and 11 that are bonded together through the columnar protrusion 12. In the present embodiment, as shown in the analysis result of FIG. 2, the Ti—Al-based compound 16 is a compound of Ti and Al and, more specifically, the Ti—Al-based compound 16 is an $Al_3Ti$ intermetallic compound. That is, in the present embodiment, the aluminum base materials 11 and 11 are bonded together at portions in which the Ti—Al-based compound 16 is present.

Figure 3:
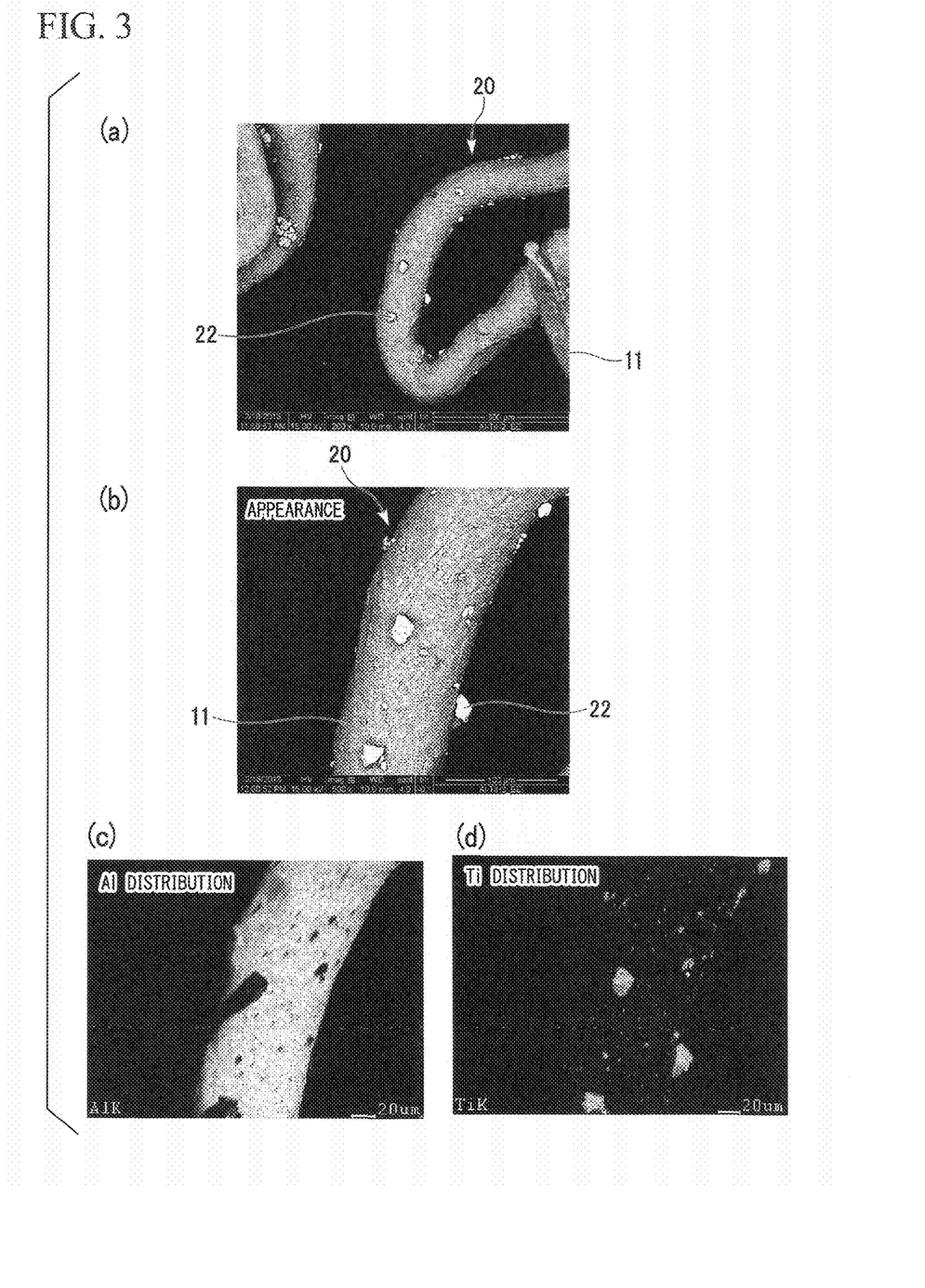
FIG. 3 shows an aluminum sintering material (aluminum material to be sintered, aluminum raw sintering material) which serves as a raw material of the porous aluminum sintered compact shown in FIG. 1.

Next, an aluminum sintering material (aluminum material to be sintered, aluminum raw sintering material) 20 which serves as a raw material of the porous aluminum sintered compact 10 that is the present embodiment will be described. As shown in FIG. 3, the aluminum sintering material 20 includes the aluminum base materials 11 and a plurality of titanium powder particles 22 fixed to the outer surface of the aluminum base material 11. Meanwhile, as the titanium powder particles 22, either one or both of metallic titanium powder particles and hydrogenated titanium powder particles can be used.

In the aluminum sintering material 20, the amount of the titanium powder particles 22 is set to be in a range of 0.5 mass % to 20 mass %, preferably in a range of 0.5 mass % to 15 mass %, and still more preferably in a range of 1.0 mass % to 10.0 mass %. In the present embodiment, the amount thereof is set to 5 mass %.

In addition, the particle diameters of the titanium powder particles 22 are set to be in a range of 1 μm to 50 μm and preferably set to be in a range of 5 μm to 30 μm. In addition, since it is possible to make the particle diameters of the hydrogenated titanium powder particles smaller than those of the metallic titanium powder particles, the hydrogenated titanium powder particles are preferably used in the case in which it is necessary to decrease the particle diameters of the titanium powder particles 22 that are fixed to the outer surfaces of the aluminum base materials 11.

Furthermore, the intervals between the titanium powder particles 22 and 22 fixed to the outer surface of the aluminum base material 11 are preferably set to be in a range of 5 μm to 100 μm and more preferably set to be in a range of 5.0 μm to 70 μm.

As the aluminum base materials 11, as described above, the aluminum fibers 11a and the aluminum powder 11b are used. As the aluminum powder 11b, atomized powder can be used.

The fiber diameters of the aluminum fibers 11a are set to be in a range of 40 μm to 300 μm and preferably set to be in a range of 50 μm to 200 μm. In addition, the fiber lengths of the aluminum fibers 11a are set to be in a range of 0.2 mm to 20 mm and preferably set to be in a range of 1 mm to 10 mm.

In addition, the particle diameters of the aluminum powder 11b are set to be in a range of 20 μm to 300 μm and preferably set to be in a range of 20 μm to 100 μm.

Furthermore, the aluminum base materials 11 are preferably made of pure aluminum having a purity of 99.5 mass % or more and, furthermore, the aluminum base materials 11 are preferably made of 4N aluminum having a purity of 99.99 mass % or more.

In addition, it becomes possible to adjust the porosity by adjusting the mixing ratio between the aluminum fibers 11a and the aluminum powder 11b. That is, when the ratio of the aluminum fibers 11a is increased, it becomes possible to increase the porosity of the porous aluminum sintered compact 10. Therefore, as the aluminum base materials 11, the aluminum fibers 11a are preferably used and, in the case in which the aluminum powder 11b is mixed, the ratio of the aluminum powder 11b is preferably set to be in a range of 10 mass % or less and more preferably set to be in a range of 1.0 mass % to 5.0 mass %.

Next, a method for producing the porous aluminum sintered compact 10 according to the present embodiment will be described with reference to the flowchart of FIG. 4.

Figure 4:
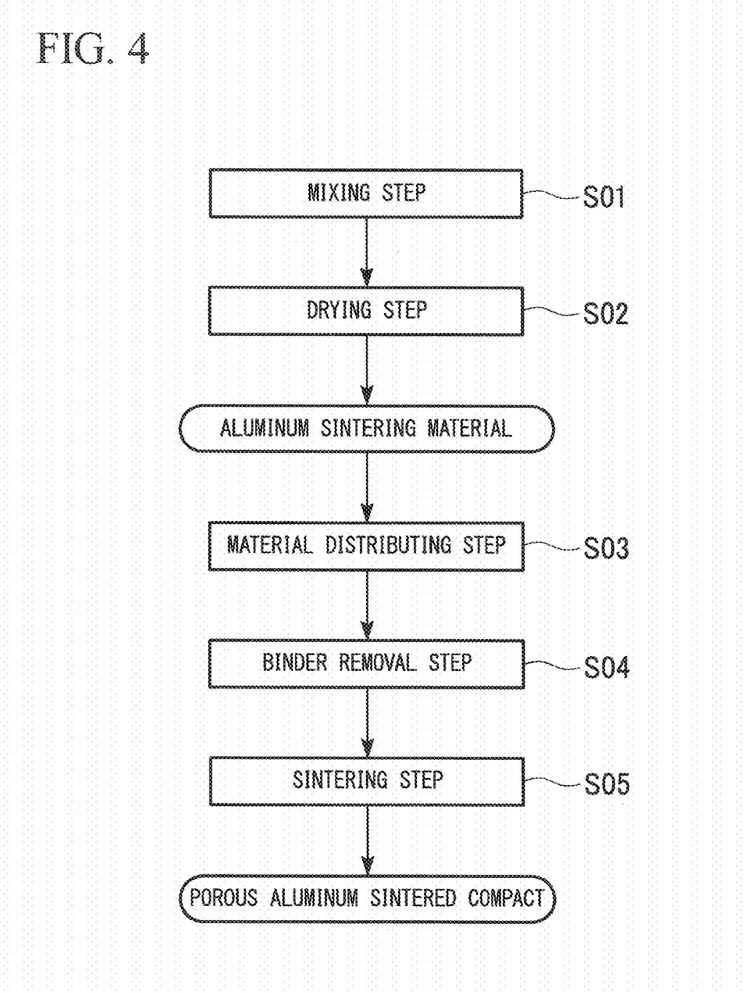
FIG. 4 is a flowchart showing an example of a method for producing the porous aluminum sintered compact shown in FIG. 1.

First, as shown in FIG. 4, the aluminum sintering material 20 which serves as the raw material of the porous aluminum sintered compact 10 that is the present embodiment is produced.

The aluminum base materials 11 and titanium powder are mixed together at normal temperature (Mixing Step S01). At this time, a binder solution is sprayed. As the binder, a binder that is combusted and decomposed when heated at 500° C. in air atmosphere is preferable and, specifically, an acryl-based resin or a cellulose-based macromolecular body is preferably used. In addition, as a solvent for the binder, a variety of solvents such as water-based solvents, alcohol-based solvents, and organic solvents can be used.

In the Mixing Step S01, the aluminum base materials 11 and the titanium powder are mixed while being made to flow using a variety of mixers such as an automatic mortar, a pan-type tumbling granulator, a shaker mixer, a pot mill, a high-speed mixer, and a V-type mixer.

Next, a mixture obtained in the Mixing Step S01 is dried (Drying Step S02). In the Drying Step S02, the mixture is preferably subjected to drying at a low temperature of 40° C. or lower, or drying at a reduced pressure of 1.33 Pa or less ($10^{-2}$ Torr or less) so as to prevent thick oxide films from being formed on the surfaces of the aluminum base materials 11. The temperature of the low-temperature drying is preferably in a range of 25° C. to 30° C. and the pressure of the reduced-pressure drying is preferably in a range of 0.5 Pa to 1.0 Pa.

Figure 5:
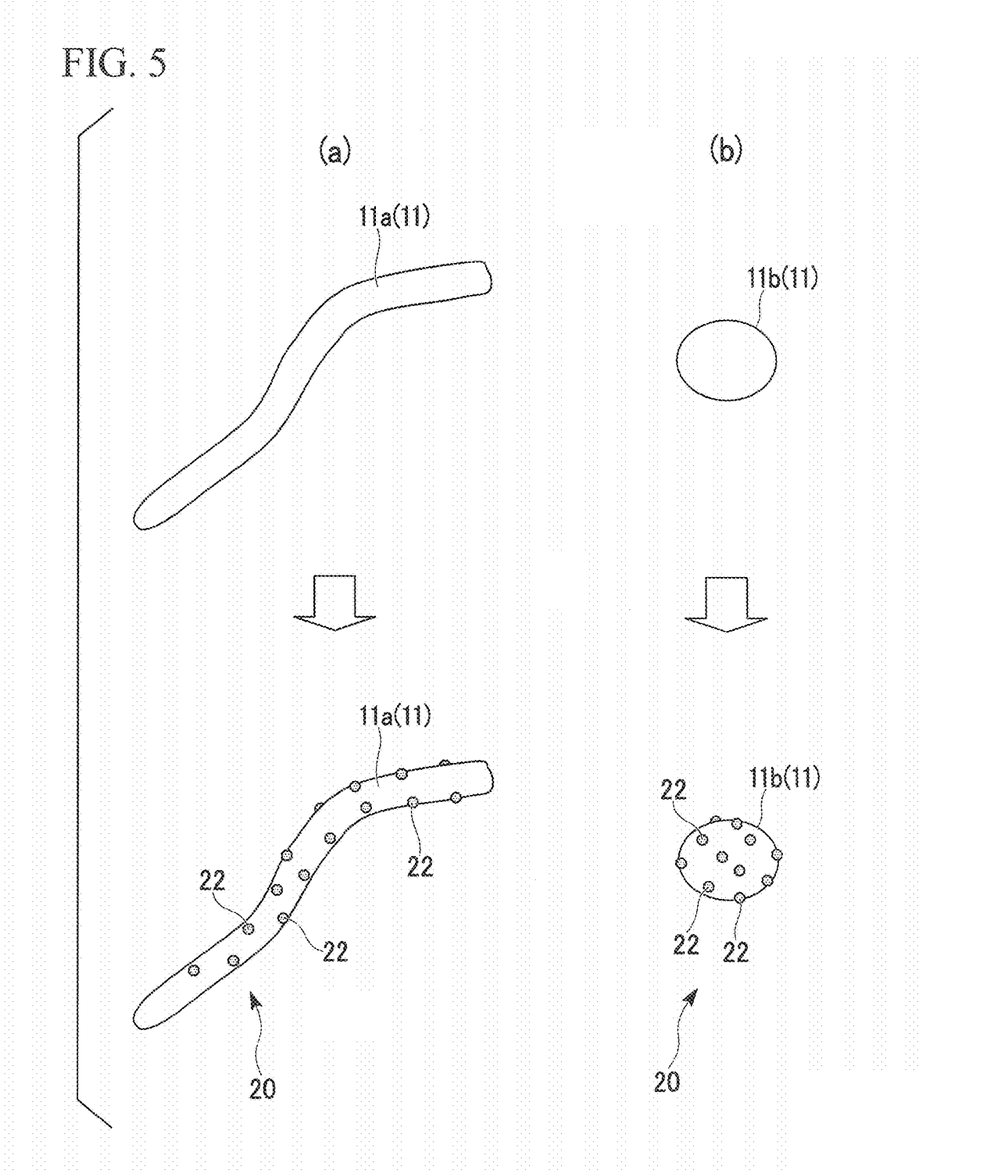
FIG. 5 shows the aluminum materials for sintering in which titanium powder particles are fixed to outer surfaces of aluminum base materials.

Through the Mixing Step S01 and the Drying Step S02, the titanium powder particles 22 are dispersed and fixed to the outer surfaces of the aluminum base materials 11 as shown in FIG. 5 and the aluminum sintering material 20 according to the present embodiment is produced. The titanium powder particles 22 are preferably dispersed so that the intervals between the titanium powder particles 22 and 22 fixed to the outer surfaces of the aluminum base materials 11 are within a range of 5 μm to 100 μm.

Next, the porous aluminum sintered compact 10 is produced using the aluminum sintering material 20 obtained in the above-described manner.

Figure 6:
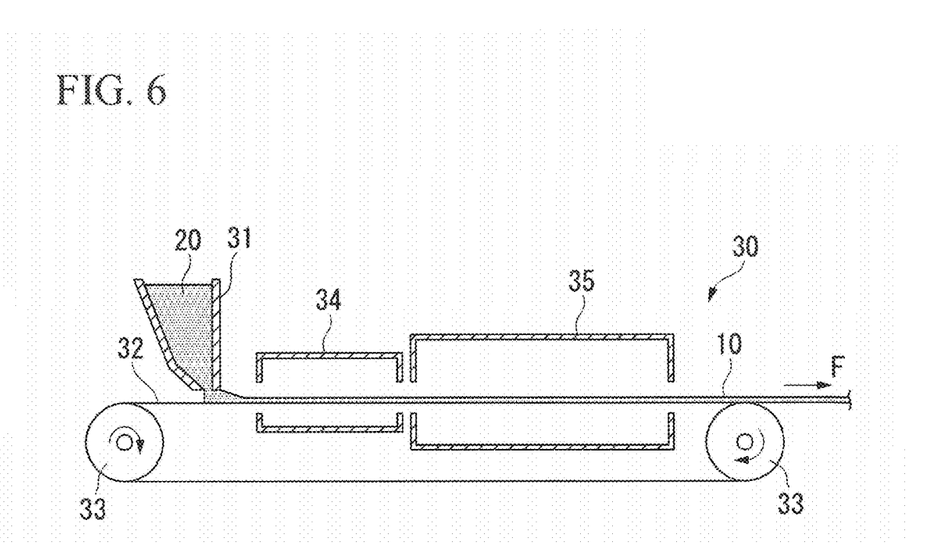
FIG. 6 is a schematic explanatory view of a continuous sintering device used to produce a sheet-shaped porous aluminum sintered compact.

In the present embodiment, for example, a long sheet-shaped porous aluminum sintered compact 10 having a width of 300 mm, a thickness in a range of 1 mm to 5 mm, and a length of 20 m is produced using a continuous sintering device 30 shown in FIG. 6.

The continuous sintering device 30 includes: a powder distributing apparatus 31 that uniformly distributes the aluminum sintering material 20; a carbon sheet 32 that holds the aluminum sintering material 20 supplied from the powder distributing apparatus 31; a transportation roller 33 that drives the carbon sheet 32; a defatting furnace 34 that heats the aluminum sintering material 20 that is transported together with the carbon sheet 32 so as to remove the binder;

and a sintering furnace 35 that heats and sinters the aluminum sintering material 20 from which the binder has been removed.

First, the aluminum sintering material 20 is distributed from the powder distributing apparatus 31 toward the carbon sheet 32 (Material Distributing Step S03).

The aluminum sintering material 20 distributed on the carbon sheet 32 spreads in the width direction of the carbon sheet 32 so as to have a uniform thickness and is shaped into a sheet shape while moving in the travelling direction F. At this time, since no load is applied, gaps are formed between the aluminum base materials 11 and 11 in the aluminum sintering material 20.

Next, the aluminum sintering material 20 that is formed into a sheet shape on the carbon sheet 32 is loaded into the defatting furnace 34 together with the carbon sheet 32 and is heated at a predetermined temperature; and thereby, the binder is removed (Binder Removal Step S04).

In the Binder Removal Step S04, the aluminum sintering material is held in air atmosphere at a temperature in a range of 350° C. to 500° C. for 0.5 minutes to 30 minutes; and thereby, the binder in the aluminum sintering material 20 is removed. The heating temperature is preferably in a range of 350° C. to 450° C. and the holding time is preferably in a range of 10 minutes to 15 minutes. In the present embodiment, since the binder is used in order to fix the titanium powder particles 22 to the outer surfaces of the aluminum base materials 11 as described above, the amount of the binder is much smaller than that in a viscous composition and it is possible to sufficiently remove the binder within a short period of time.

Next, the aluminum sintering material 20 from which the binder has been removed is loaded into a sintering furnace 35 together with the carbon sheet 32 and is heated at a predetermined temperature so as to be sintered (Sintering Step S05).

In the Sintering Step S05, the aluminum sintering material is held in an inert gas atmosphere at a temperature in a range of 655° C. to 665° C. for 0.5 minutes to 60 minutes. The heating temperature is preferably in a range of 657° C. to 662° C. and the holding time is preferably set to be in a range of 1 minute to 20 minutes.

By using an inert gas atmosphere such as Ar gas and the like as the sintering atmosphere in the Sintering Step S05, it is possible to sufficiently decrease the dew point. A hydrogen atmosphere or a mixed atmosphere of hydrogen and nitrogen is not preferable since it is difficult to decrease the dew point. In addition, since nitrogen reacts with Ti so as to form TiN, the sintering acceleration effect of Ti is lost, which is not preferable.

Therefore, in the present embodiment, as the atmosphere gas, an Ar gas having a dew point of −50° C. or lower is used. The dew point of the atmosphere gas is more preferably set to be in a range of −65° C. or lower.

Figure 7:
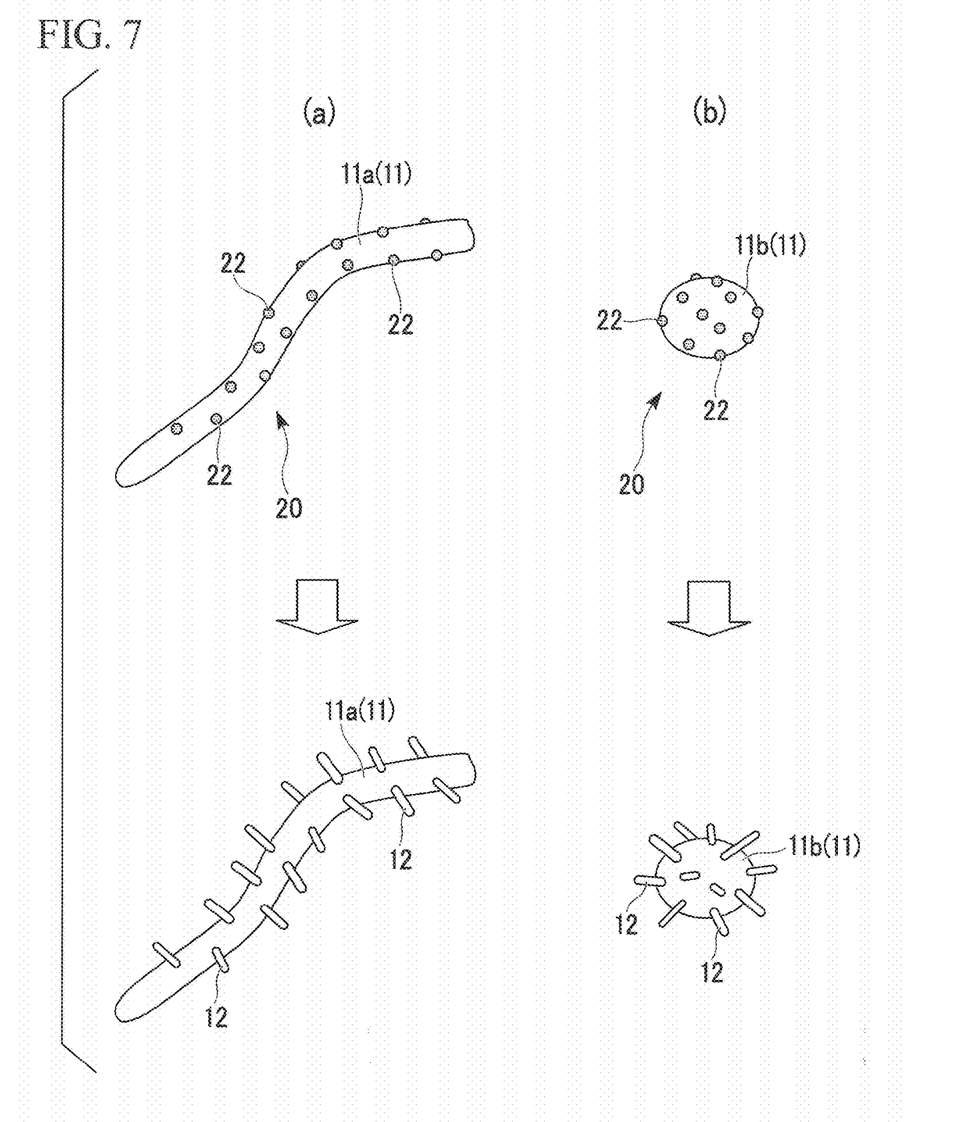
FIG. 7 shows a state in which columnar protrusions are formed on the outer surfaces of the aluminum base material in a sintering step.

In the Sintering Step S05, since the aluminum sintering material is heated at a temperature in a range of 655° C. to 665° C., which is approximate to the melting point of aluminum, the aluminum base materials 11 in the aluminum sintering material 20 are melted. Since oxide films are formed on the surfaces of the aluminum base materials 11, the molten aluminum is held by the oxide films and the shapes of the aluminum base materials 11 are maintained.

In addition, when the aluminum sintering material is heated at a temperature in a range of 655° C. to 665° C., in the outer surfaces of the aluminum base materials 11, the oxide films are broken by the reaction with titanium on the portions to which the titanium powder particles 22 are fixed, and the molten aluminum inside the aluminum sintering material is ejected outwards. The ejected molten aluminum reacts with titanium and thus a compound having a higher melting point is generated and solidified. Thereby, as shown in FIG. 7, a plurality of columnar protrusions 12 protruding outwards are formed on the outer surfaces of the aluminum base materials 11. At the tips of the columnar protrusions 12, the Ti—Al-based compound 16 is present, and the Ti—Al-based compound 16 suppresses (limits) the growth of the columnar protrusions 12.

In the case in which hydrogenated titanium is used as the titanium powder particles 22, the hydrogenated titanium is decomposed at a temperature within or in the vicinity of 300° C. to 400° C. and the generated titanium reacts with the oxide films on the surfaces of the aluminum base materials 11.

At this time, adjacent aluminum base materials 11 and 11 are bonded together by being integrated together in a molten state or solid-phase sintering through the columnar protrusions 12 on both of the aluminum base materials and, as shown in FIG. 1, the porous aluminum sintered compact 10 is produced in which a plurality of the aluminum base materials 11 and 11 are bonded together through the columnar protrusions 12. In addition, the Ti—Al-based compound 16 (the $Al_3Ti$ intermetallic compound) is present in the bonding portions 15 at which the aluminum base materials 11 and 11 are bonded together through the columnar protrusions 12.

In the porous aluminum sintered compact 10 according to the present embodiment having the above-described features, since the Ti—Al-based compound 16 is present in the bonding portions 15 between the aluminum base materials 11 and 11, the oxide films formed on the surfaces of the aluminum base materials 11 are removed by the Ti—Al-based compound 16 and the aluminum base materials 11 and 11 are favorably bonded together. Therefore, it is possible to obtain a high-quality porous aluminum sintered compact 10 having sufficient strength.

In addition, since the Ti—Al-based compound 16 suppresses (limits) the growth of the columnar protrusions 12, the ejection of the molten aluminum into the gaps between the aluminum base materials 11 and 11 can be suppressed (limited) and it is possible to obtain a porous aluminum sintered compact 10 having high porosity.

Particularly, in the present embodiment, since $Al_3Ti$ is present as the Ti—Al-based compound 16 in the bonding portions 15 between the aluminum base materials 11 and 11, the oxide films formed on the surfaces of the aluminum base materials 11 are reliably removed, the aluminum base materials 11 and 11 are favorably bonded together, and it is possible to ensure the strength of the porous aluminum sintered compact 10.

In addition, since a structure is provided in which the aluminum base materials 11 and 11 are bonded together through the columnar protrusions 12 formed on the outer surfaces of the aluminum base materials 11, it is possible to obtain a porous aluminum sintered compact 10 having high porosity without separately carrying out a foaming step and the like. Therefore, it becomes possible to efficiently produce the porous aluminum sintered compact 10 at low cost.

Particularly, in the present embodiment, since the continuous sintering device 30 shown in FIG. 6 is used, it is possible to continuously produce the sheet-shaped porous aluminum sintered compacts 10 and the production efficiency is greatly improved.

Furthermore, in the present embodiment, since the amount of the binder is much smaller than that in a viscous composition, it is possible to carry out the Binder Removal Step S04 within a short period of time. In addition, since the shrinkage ratio during sintering becomes as small as, for example, approximately 1%, it becomes possible to obtain a porous aluminum sintered compact 10 having excellent dimensional accuracy.

In addition, in the present embodiment, since the aluminum fibers 11a and the aluminum powder 11b are used as the aluminum base materials 11, it becomes possible to control the porosity of the porous aluminum sintered compact 10 by adjusting the mixing ratio thereof.

In addition, in the porous aluminum sintered compact 10 according to the present embodiment, since the porosity is set to be in a range of 30% to 90%, it becomes possible to provide a porous aluminum sintered compact 10 having the optimal porosity for a particular use.

Furthermore, in the present embodiment, since the amount of the titanium powder particles 22 in the aluminum sintering material 20 is set to be in a range of 0.5 mass % to 20 mass %, it is possible to form the columnar protrusions 12 at appropriate intervals on the outer surfaces of the aluminum base materials 11 and it is possible to obtain a porous aluminum sintered compact 10 having sufficient strength and high porosity.

In addition, in the present embodiment, since the intervals between the titanium powder particles 22 and 22 fixed to the outer surface of the aluminum base material 11 are set to be in a range of 5 μm to 100 μm, the intervals between the columnar protrusions 12 are optimized, and it is possible to obtain a porous aluminum sintered compact 10 having sufficient strength and high porosity.

Furthermore, in the present embodiment, since the fiber diameters of the aluminum fibers 11a, which are the aluminum base materials 11, are set to be in a range of 40 μm to 300 μm, the particle diameters of the aluminum powder 11b are set to be in a range of 20 μm to 300 μm, and the particle diameters of the titanium powder particles 22 are set to be in a range of 1 μm to 50 μm, it is possible to reliably disperse and fix the titanium powder particles 22 to the outer surfaces of the aluminum base materials 11 (the aluminum fibers 11a and the aluminum powder 11b).

In addition, in the present embodiment, since the aluminum base materials 11 are made of pure aluminum having a purity of 99.5 mass % or more and, furthermore, the aluminum base materials 11 are made of 4N aluminum having a purity of 99.99 mass % or more, it is possible to improve the corrosion resistance of the porous aluminum sintered compact 10.

Furthermore, in the present embodiment, since the aluminum fibers 11a and the aluminum powder 11b are used as the aluminum base materials 11 and the mixing ratio of the aluminum powder 11b is set to be in a range of 10 mass % or less, it is possible to obtain a porous aluminum sintered compact 10 having high porosity.

Thus far, the embodiment of the present invention has been described, but the present invention is not limited thereto and can be appropriately modified within the scope of the technical features of the invention.

For example, the method in which the porous aluminum sintered compacts are continuously produced using the continuous sintering device shown in FIG. 6 has been described, but the method is not limited thereto and the porous aluminum sintered compact may be produced using other production devices.

Figure 8:
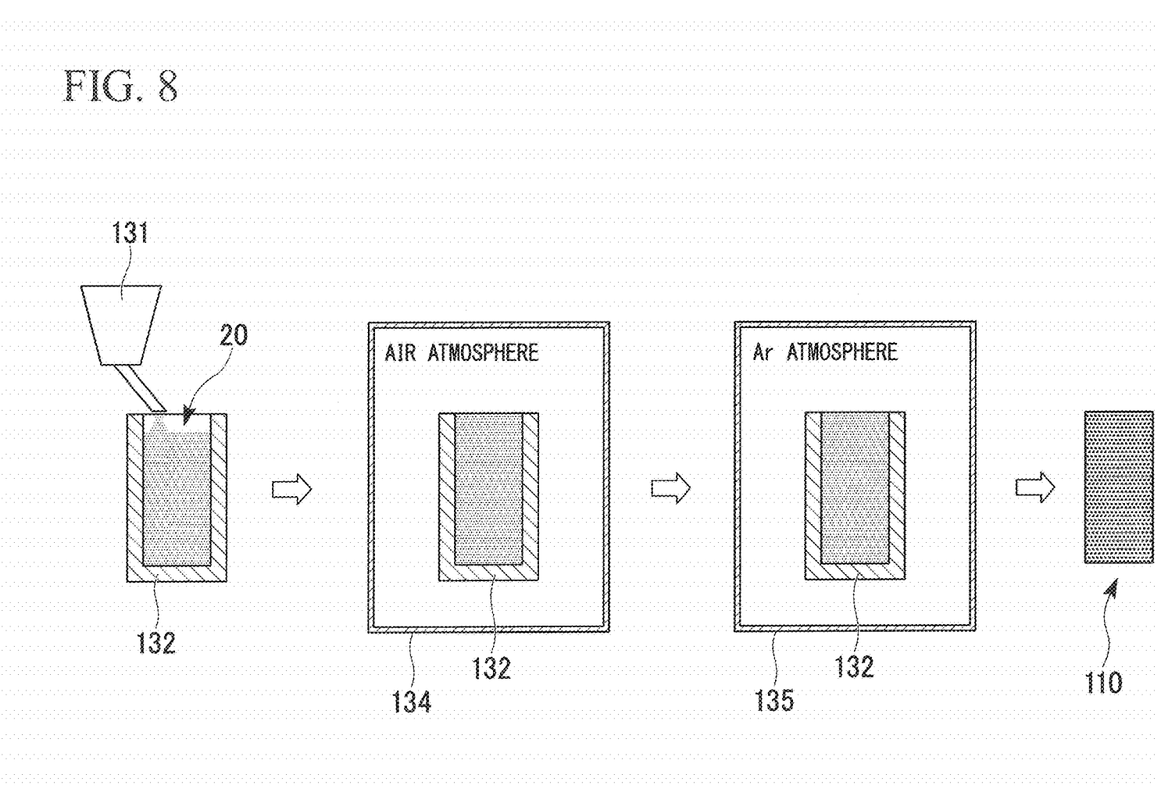
FIG. 8 is an explanatory view showing a production step of producing a bulk-shaped porous aluminum sintered compact.

In addition, in the present embodiment, the sheet-shaped porous aluminum sintered compact has been described, but the shape is not limited thereto and the porous aluminum sintered compact may be, for example, a bulk-shaped porous aluminum sintered compact produced through production steps shown in FIG. 8.

As shown in FIG. 8, the aluminum sintering material 20 is distributed from a powder distributing apparatus 131 that distributes the aluminum sintering material 20 toward the inside of a carbon container 132; and thereby, bulk filling is carried out (Material Distributing Step). The carbon container 132 filled with the aluminum sintering material 20 is loaded into a defatting furnace 134 and is heated in air atmosphere; and thereby, a binder is removed (Binder Removal Step). After that, the aluminum sintering material is loaded into a sintering furnace 135 and is heated and held in an Ar atmosphere at a temperature in a range of 655° C. to 665° C.; and thereby, a bulk-shaped porous aluminum sintered compact 110 is obtained. Since the carbon container 132 having favorable mold release properties is used and the porous aluminum sintered compact shrinks approximately 1% during sintering, it is possible to remove the bulk-shaped porous aluminum sintered compact 110 from the carbon container 132 in a relatively easy manner.

INDUSTRIAL APPLICABILITY

The porous aluminum sintered compact of the present invention can be efficiently produced at low cost and has a small shrinkage ratio during sintering, excellent dimensional accuracy, and sufficient strength. Therefore, the porous aluminum sintered compact of the present invention can be preferably used for electrodes and current collectors in a variety of batteries, heat exchanger components, silencing components, filters, impact-absorbing components, and the like.

DESCRIPTION OF THE REFERENCE NUMERALS 10, 110 POROUS ALUMINUM SINTERED COMPACT
11 ALUMINUM BASE MATERIAL
11a ALUMINUM FIBER
11b ALUMINUM POWDER
12 COLUMNAR PROTRUSION
15 BONDING PORTION
16 Ti—Al-BASED COMPOUND
20 ALUMINUM SINTERING MATERIAL
22 TITANIUM POWDER PARTICLE

The invention claimed is:
1. A porous aluminum sintered compact in which a plurality of aluminum base materials are sintered together,
wherein the aluminum base materials are composed of aluminum fibers and aluminum powder with a mixing ratio of aluminum powder in a range of 1.0 mass % to 10 mass %,
molten aluminum inside the aluminum base material is ejected outwards and solidified in a sintering step so that columnar protrusions protruding outwards are formed on an outer surface of the aluminum base material,
shapes of the aluminum base materials are maintained after being melted,
the porous aluminum sintered compact includes bonding portions at which the aluminum base materials are bonded together through the columnar protrusions, and
a Ti—Al-based compound is present in bonding portions.
2. The porous aluminum sintered compact according to claim 1, wherein the Ti—Al-based compound is Al3Ti.

3. The porous aluminum sintered compact according to claim 1, wherein a porosity is set to be in a range of 30% to 90%.

4. The porous aluminum sintered compact according to claim 2, wherein a porosity is set to be in a range of 30% to 90%.

5. The porous aluminum sintered compact according to claim 1, wherein the bonding portion is formed by at least two columnar protrusions.

6. The porous aluminum sintered compact according to claim 1, wherein the columnar protrusions are significantly smaller than the aluminum fibers.

\* \* \* \* \*